(12) United States Patent
Klopp et al.

(10) Patent No.: US 9,812,935 B2
(45) Date of Patent: Nov. 7, 2017

(54) ELECTRIC MACHINE, CONDUCTOR GUIDE AND ASSOCIATED METHOD

(71) Applicant: Regal Beloit America, Inc., Beloit, WI (US)

(72) Inventors: Mark Lyon Klopp, Berne, IN (US); Zachary Joseph Stauffer, Fort Wayne, IN (US); Michael Allen Marks, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 13 days.

(21) Appl. No.: 14/463,038

(22) Filed: Aug. 19, 2014

(65) Prior Publication Data
US 2016/0056693 A1 Feb. 25, 2016

(51) Int. Cl.
*H02K 11/02* (2016.01)
*H02K 11/22* (2016.01)
*H02K 11/40* (2016.01)

(52) U.S. Cl.
CPC ........... *H02K 11/022* (2013.01); *H02K 11/40* (2016.01)

(58) Field of Classification Search
CPC ........ H02K 3/32; H02K 3/345; H02K 11/022; H02K 11/024; H02K 11/40; H02K 11/01; H02K 11/02
USPC ........................................................ 310/215
See application file for complete search history.

(56) References Cited

U.S. PATENT DOCUMENTS

| | | | |
|---|---|---|---|
| 3,781,927 A | 1/1974 | Zararas | |
| 4,212,509 A * | 7/1980 | Brooks | ............... H01R 4/2462 439/396 |
| 4,308,476 A | 12/1981 | Schuler | |
| 4,318,020 A | 3/1982 | Meyer | |
| 5,661,353 A | 8/1997 | Erdman et al. | |
| 5,821,649 A | 10/1998 | Langhorst | |
| 5,821,652 A | 10/1998 | Hyypio | |
| 5,952,761 A | 9/1999 | Itoh et al. | |
| 5,979,087 A | 11/1999 | Bell et al. | |

(Continued)

FOREIGN PATENT DOCUMENTS

| | | |
|---|---|---|
| CN | 100355187 C | 12/2007 |
| JP | 10193488 A | 7/1998 |

(Continued)

*Primary Examiner* — Quyen Leung
*Assistant Examiner* — Eric Johnson
(74) *Attorney, Agent, or Firm* — John Wagley

(57) ABSTRACT

An electric machine is provided. The electric machine includes a rotor and a stator. The stator includes a plurality of teeth and a plurality of windings. Each of the plurality of windings is positioned around at least one of the plurality of teeth. The electric machine further includes a leakage current shielding system. The leakage current shielding system includes a plurality of leakage current shields. Each of the current shields includes a body portion thereof which is positioned between the plurality of teeth and the plurality of windings. Each of the leakage current shields also includes a connecting portion that extends from the body portion. The leakage current shielding system also includes a plurality of connectors. Each of the plurality of connectors is adapted for receiving the connection portion of the leakage current shield. The leakage current shielding system also includes a connecting ring for securing the plurality of connectors.

20 Claims, 12 Drawing Sheets

(56) References Cited

U.S. PATENT DOCUMENTS

| | | | |
|---|---|---|---|
| 6,011,338 A | 1/2000 | Bell et al. | |
| 6,134,126 A | 10/2000 | Ikekame et al. | |
| 6,176,691 B1 | 1/2001 | Tsubokawa | |
| 6,202,285 B1 | 3/2001 | Bell | |
| 6,707,186 B2 * | 3/2004 | Oppitz | H02K 3/522 310/179 |
| 6,720,692 B2 | 4/2004 | Bell | |
| 6,756,712 B1 | 6/2004 | Schuren | |
| 6,800,973 B2 * | 10/2004 | Futami | H01R 4/2458 310/71 |
| 7,250,700 B2 | 7/2007 | Maki-Ontto | |
| 7,952,251 B2 | 5/2011 | Chretien et al. | |
| 2003/0173854 A1 * | 9/2003 | Oppitz | H02K 3/522 310/184 |
| 2006/0145560 A1 | 7/2006 | Maki-Ontto | |
| 2010/0007235 A1 * | 1/2010 | Chretien | H02K 11/01 310/213 |
| 2012/0161570 A1 * | 6/2012 | Schutten | H02K 3/345 310/215 |
| 2014/0265673 A1 | 9/2014 | Kreidler et al. | |

FOREIGN PATENT DOCUMENTS

| | | |
|---|---|---|
| JP | 2000161222 A | 6/2000 |
| JP | 2007327497 A | 12/2007 |

* cited by examiner

ELECTRIC MACHINE, CONDUCTOR GUIDE AND ASSOCIATED METHOD

BACKGROUND OF THE INVENTION

The field of the invention relates generally to electric machines and more specifically to the reduction of leakage current present in electric machines.

Leakage current is produced during the operation of various types of electric machines, for example, electric motors and electric generators. Typically, an electric machine includes a stator and a rotor. The stator includes a plurality of teeth that are wrapped with wire windings. The electric machine may include an insulation between the windings and the stator teeth. This configuration of windings, insulation, and stator teeth creates a capacitance, referred to as machine parasitic capacitance. High frequency switching of voltages applied to the windings creates a potential difference across the parasitic capacitance, and as a result, a circulating current generally referred to as leakage current when the stator enclosure is tied to earth ground. The leakage current across the parasitic capacitance prevents the power lines feeding the system to be balanced, as part of the supplied current returns through earth ground. Electric machines that include internal shielding to reduce the presence of shaft voltages and bearing currents typically couple the shielding to earth ground. However, coupling a shield of this type to earth ground does not reduce leakage current.

Leakage current may cause tripping of a circuit breaker, for example, a circuit breaker included in a ground fault circuit interrupter (GFCI). A GFCI is positioned between a power source and a device to prevent injury due to electric shock. For example, in the United States of America, a typical 120 Volt electrical outlet includes connections for a "hot" wire, a "neutral." wire, and an "earth ground" wire. The GFCI senses when there is a difference between the electric currents in the hot wire and the neutral wire. Detection of a difference between those currents may indicate a malfunction. For example, a difference between the currents may indicate that electric current is traveling to ground through an unintended path, such as if a person has come in contact with the hot wire and is providing an electrical path to ground. The difference between the currents in the hot wire and the neutral wire may often be qualified as leakage current. Leakage current does not return via the neutral wire, but rather may be present in a ground wire. Tripping of a GFCI due to leakage current may be referred to as nuisance tripping. A reduction of leakage current may prevent nuisance tripping of a GFCI.

The Applicant have disclosed in U.S. Pat. No. 7,952,251 B2 electric machines that include internal shielding to reduce the presence of shaft voltages and bearing currents that couple the shielding to a reference point that is not earth ground. Coupling a shield of this type to a reference point that is not earth ground does reduce leakage current.

The shielding disclosed in U.S. Pat. No. 7,952,251 B2 consists of a unitary sheet that is fed around the stator teeth of the motor and positioned between the teeth and the stator coils. Construction of this shielding device requires the use of very expensive tooling and the installation of this shielding device is very time consuming.

The present invention is directed toward alleviating at least some of the above mentioned difficulties with the prior art.

BRIEF DESCRIPTION OF THE INVENTION

According to an embodiment of the present invention, an electric machine is provided. The electric machine includes a rotor and a stator. The stator includes a plurality of teeth and a plurality of windings. Each of the plurality of windings are positioned around at least one of the plurality of teeth. The electric machine further includes a leakage current shielding system. The leakage current shielding system includes a plurality of leakage current shields. Each of the plurality of leakage current shields includes a body portion thereof which is positioned between the plurality of teeth and the plurality of windings. Each of the plurality of leakage current shields also includes a connecting portion that extends from the body portion. The leakage current shielding system also includes a plurality of connectors. Each of the plurality of connectors is adapted for receiving the connection portion of the leakage current shield. The leakage current shielding system also includes a connecting ring for securing the plurality of connectors.

According to an aspect of the present invention, the electric machine may be provided wherein the plurality of leakage current shields includes a conductive layer coupled to a reference point having an electric potential that is not earth ground.

According to another aspect of the present invention, the electric machine may be provided wherein the electric machine further includes a connector configured to couple the conductive layer to the reference point.

According to another aspect of the present invention, the electric machine may be provided wherein each of the plurality of leakage current shields further includes a first insulating layer positioned between at least one of the plurality of teeth and the conductive layer and a second insulating layer positioned adjacent to the conductive layer, opposite to the first insulating layer.

According to another aspect of the present invention, the electric machine may be provided wherein the conductive layer is coupled to a potential that is not earth ground and adapted to further facilitate reducing one or more of a shaft voltage, a bearing current present in the electric machine, and electromagnetic interference (EMI) created by the electric machine.

According to another aspect of the present invention, the electric machine may be provided wherein each of the plurality of leakage current shields is separated from each other.

According to another aspect of the present invention, the electric machine may be provided wherein the leakage current shielding system further includes a conductor for connecting the leakage current shields to each other.

According to another aspect of the present invention, the electric machine may be provided wherein the connectors are configured to receive the connecting portion of the leakage current shield in a first direction and to receive the conductor in a second direction, normal to the first direction.

According to another aspect of the present invention, the electric machine may be provided wherein the electric machine is coupled to and controlled by a variable frequency drive circuit.

According to another embodiment of the present invention, a leakage current shielding system for an electric machine is provided. The electric machine has a stator that includes a plurality of windings positioned around at least one stator tooth. The leakage current shielding system includes a plurality of leakage current shields. Each of the plurality of leakage current shields has a body portion thereof positioned between the plurality of teeth and the plurality of windings and a connecting portion extending from the body portion. The leakage current shielding system also includes a plurality of connectors. Each of the plurality of connectors is adapted for receiving the connection portion of the leakage current shield. The leakage current shielding system also includes a connecting ring for securing the plurality of connectors.

According to another aspect of the present invention, the leakage current shielding system may be provided wherein the plurality of leakage current shields includes a conductive layer coupled to a reference point having an electric potential that is not earth ground.

According to another aspect of the present invention, the leakage current shielding system may be provided wherein the system further includes a connector configured to couple the conductive layer to the reference point.

According to another aspect of the present invention, the leakage current shielding system may be provided wherein each of the plurality of leakage current shields further includes a first insulating layer positioned between at least one of the plurality of teeth and the conductive layer and a second insulating layer positioned adjacent to the conductive layer, opposite to the first insulating layer.

According to another aspect of the present invention, the leakage current shielding system may be provided wherein each of the plurality of leakage current shields is separated from each other.

According to another aspect of the present invention, the leakage current shielding system may be provided wherein the leakage current shielding system further includes a conductor for connecting the leakage current shields to each other.

According to another aspect of the present invention, the leakage current shielding system may be provided wherein the connectors are configured to receive the connecting portion of the leakage current shield in a first direction and to receive the conductor in a second direction, normal to the first direction.

According to another embodiment of the present invention, a leakage current shielding kit or system for use in a first electric machine having a first motor size and for use in a second electric machine having a second motor size, substantially different than the first motor size of the first motor, is provided. Each of the electric machines has a stator that includes a plurality of windings positioned around at least one stator tooth. The leakage current shielding kit includes a plurality of leakage current shields. Each of the plurality of leakage current shields includes a body portion thereof positioned between the plurality of teeth and the plurality of windings and a connecting portion extending from the body portion. The plurality of leakage current shields is adapted for use in both the first electric machine and the second electric machine. Each of the plurality of leakage current shields also includes a plurality of connectors. Each of the plurality of connectors is adapted for receiving the connection portion of the leakage current shield. The plurality of connectors is adapted for use in both the first electric machine and the second electric machine. Each of the plurality of leakage current shields also includes a first connecting ring for securing the plurality of connectors and adapted for use in the first electric machine and a second connecting ring for securing the plurality of connectors and adapted for use in the second electric machine.

According to another aspect of the present invention, the leakage current shielding kit may be provided wherein the leakage current shielding system further includes a conductor for connecting the leakage current shields to each other.

According to another aspect of the present invention, the leakage current shielding kit may be provided wherein the connectors are configured to receive the connecting portion of the leakage current shield in a first direction and to receive the conductor in a second direction, normal to the first direction.

According to another embodiment of the present invention, a method for reducing leakage currents in an electric machine is provided. The method includes the steps of positioning a plurality of individual leakage current shields between windings and teeth of a stator, positioning a connecting ring for cooperation with the stator, securing at least one of the plurality of connectors to the connection ring, securing at least one of the plurality of individual leakage current shields to the plurality of connectors, and coupling, with one of the plurality of connectors, at least one of the plurality of leakage current shields to a reference point, wherein an electric potential at the reference point is not earth ground.

DETAILED DESCRIPTION OF THE INVENTION

Figure 1:
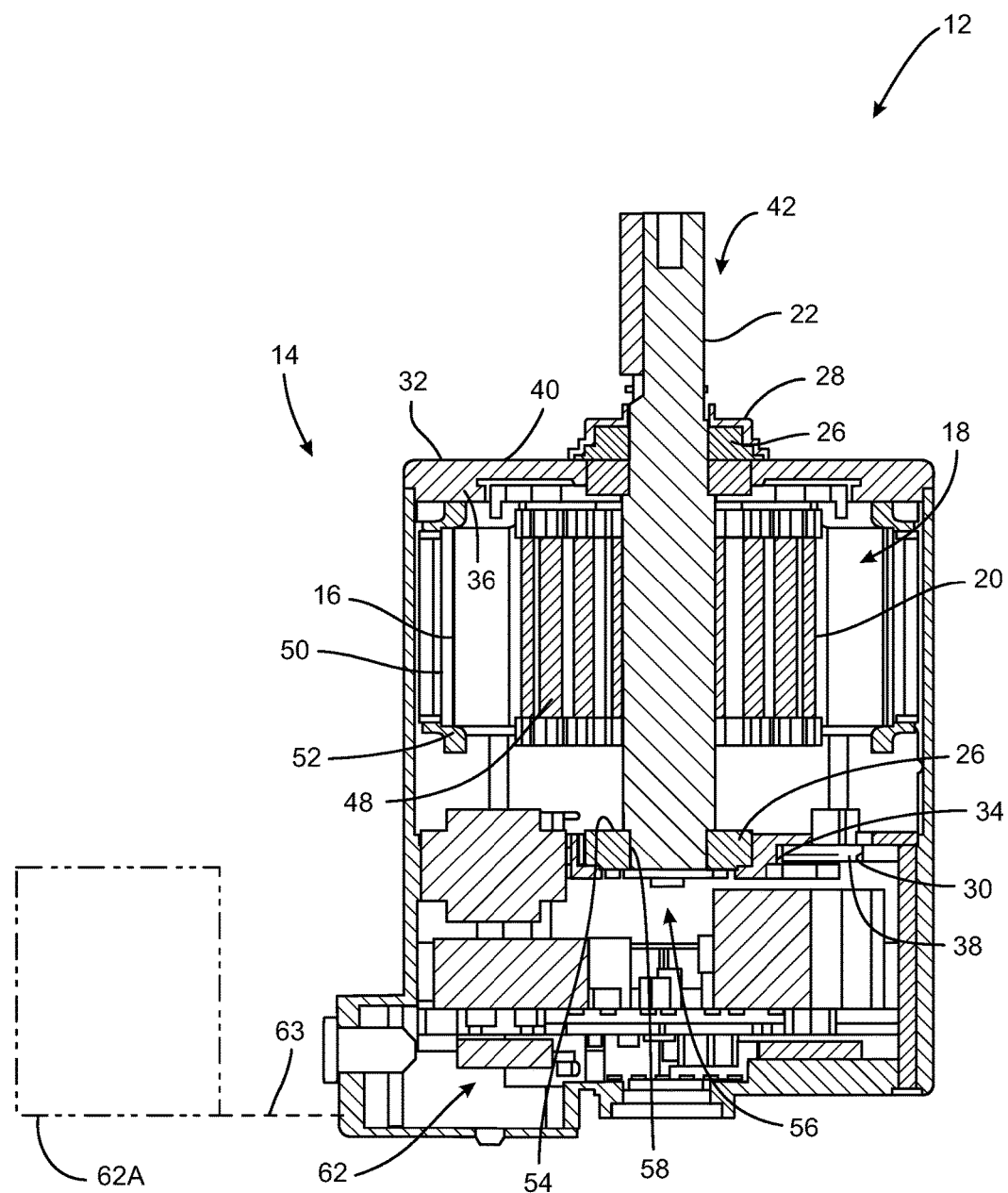
FIG. 1 is an plan view illustration of an exemplary electric motor.

FIG. 1 is an expanded view illustration of an exemplary electric machine 12. In the exemplary embodiment, the electric machine 12 is the form of an electric motor. For example and as shown the motor 12 is in the form of an alternating current (AC) motor 12 having a stationary assembly 14 including a stator or core 16 and a rotatable assembly 18 including a rotor 20 and a shaft 22. A fan (not shown) or other assembly to be driven, such as an assembly for moving air through an air handling system, engages shaft 22. Although electric machine 12 is described and illustrated herein as be in the form of an electric motor 12, electric motor 12 may function as described herein when in the form of a generator.

In the exemplary embodiment, rotor 20 is mounted on and keyed to shaft 22, journaled for rotation in bearings 26. Bearings 26 are mounted in bearing supports 28 of a first end member 30 and a second end member 32. The end members 30 and 32 are substantially parallel to each other. The end members 30 and 32 have inner facing sides 34 and 36, respectively, between which the stationary assembly 14 and the rotatable assembly 18 are located. Each end member 30 and 32 has an outer side 38 and 40 opposite its inner side 34 and 36, respectively. Additionally, second end member 32 has an aperture 42 for the shaft 22 to pass through and extend out from the outer side 40.

In the exemplary embodiment, the rotor 20 comprises a plurality of metal bars 48, often referred to as a squirrel-cage, and is rotatable within the bore of stator 16. Stator 16 comprises a plurality of windings 50 adapted to be electrically energized to generate an electromagnetic field. Windings 50 are coils of wire wound around teeth 52 of the laminated stator core 16. The winding end turns extend beyond the stator end faces and winding terminal leads 54 are brought out through an aperture 56 in the first end member 30 terminating in a connector 58. Motor control circuitry 62 and a power source (not shown in FIG. 1) are coupled to windings 50 by connector 58. Note that this coupling is a functional coupling such that power is properly supplied to the windings 50. While as shown in FIG. 1, the motor control circuitry 62 and the power source are mechanically coupled or integrated unit, it should be appreciated that the circuitry and windings may be mechanically uncoupled. In particular it should be appreciated that a motor control 62A that is positioned outside motor housing 63 may be utilized in addition to or in place of motor control 62. While stationary assembly 14 is illustrated for purposes of disclosure, it is contemplated that other stationary assemblies of various other constructions having different shapes and with different numbers of poles and/or teeth may be utilized.

AC motor 12 as described herein merely for purposes of disclosure is an eight rotor-pole motor, but it will be understood that the motor described herein may include any even number of rotor poles and the number of stator poles may be a multiple of the number of rotor poles. Furthermore, while motor 12 is described herein as an AC asynchronous motor, any type of electric motor that produces leakage current may benefit from a reduction in leakage current. In one exemplary embodiment not shown in FIG. 1, a three-phase motor includes six rotor pole pairs and eighteen stator poles.

Figure 2:
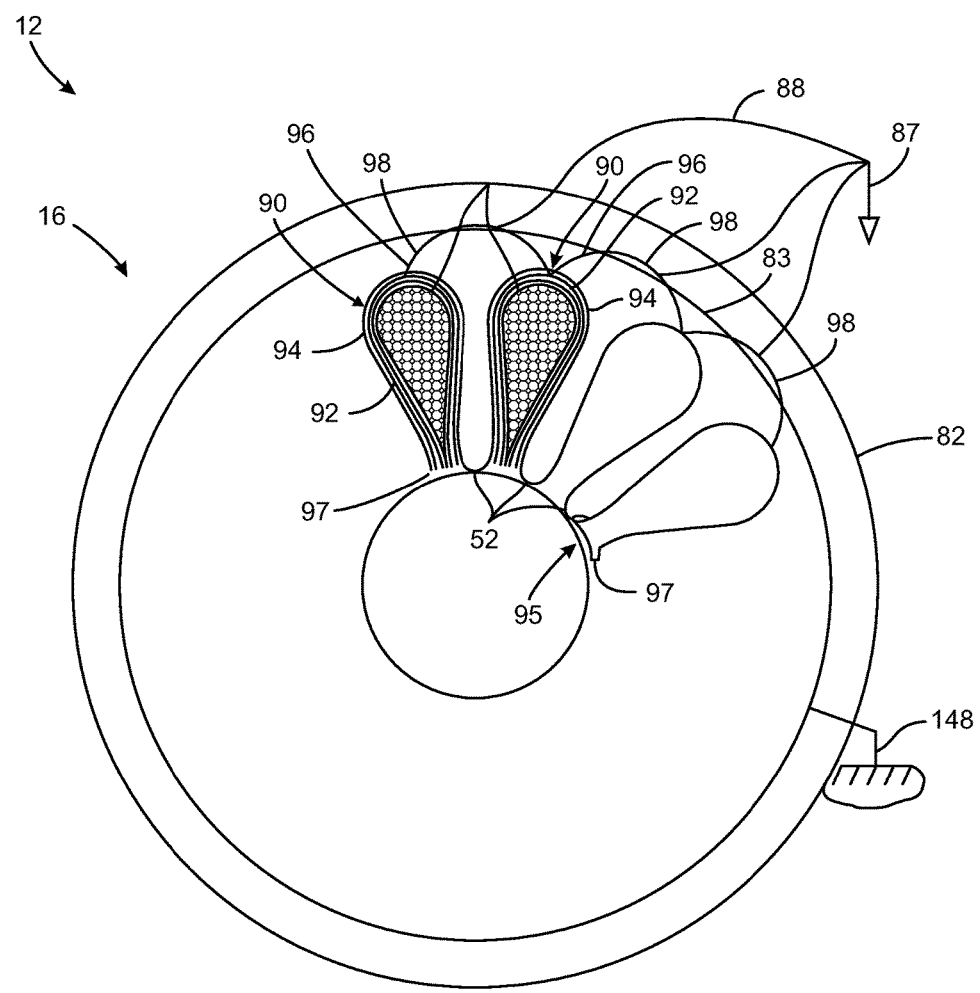
FIG. 2 is a partial cross-sectional end view of an exemplary stator for use in the electric motor shown in FIG. 1.

FIG. 2 is a partial cross-sectional illustration of an exemplary stator 80 that may be included within electric motor 12 shown in FIG. 1. Stator 16 includes a stator shell 82, and a stator core 83 that includes a plurality of teeth 52. In the exemplary embodiment, a plurality of windings 50 is wrapped around each of the plurality of teeth 52. In an alternative embodiment, windings 50 may be wrapped around two teeth 52, or any number of teeth 52 that allows electric motor 12 to function as described herein. In the exemplary embodiment, stator shell 82 and stator core 83 are coupled to earth ground 148 by ground wire (It should be appreciated that reference point 87 (also referred to herein as electronic ground 87) is at a potential that is different from earth ground).

According to an embodiment of the present invention and as shown in FIG. 2, the electric motor 12 is shown in greater detail. The electric motor 12 further includes a leakage current shielding system 90. The leakage current shielding system 90 includes a plurality of leakage current shields 92. Each of the plurality of leakage current shields 92 includes a body portion 94 thereof which is positioned between the plurality of teeth 52 and the plurality of windings 50. The body portion 94 is preferably sized and configured to fit into one of a plurality of pockets 95 formed between adjacent teeth 52 of the plurality of teeth 52. The body portion 94 may be contained by protrusions or lips 97 formed at the end of the teeth 52. The shields 92 may be made of a conformable material that fits into one of the plurality of pockets 95 and may closely conform to one of the plurality of teeth 52. Each of the plurality of leakage current shields 92 also includes a connecting portion 96 that extends from the body portion 94.

Figure 3:
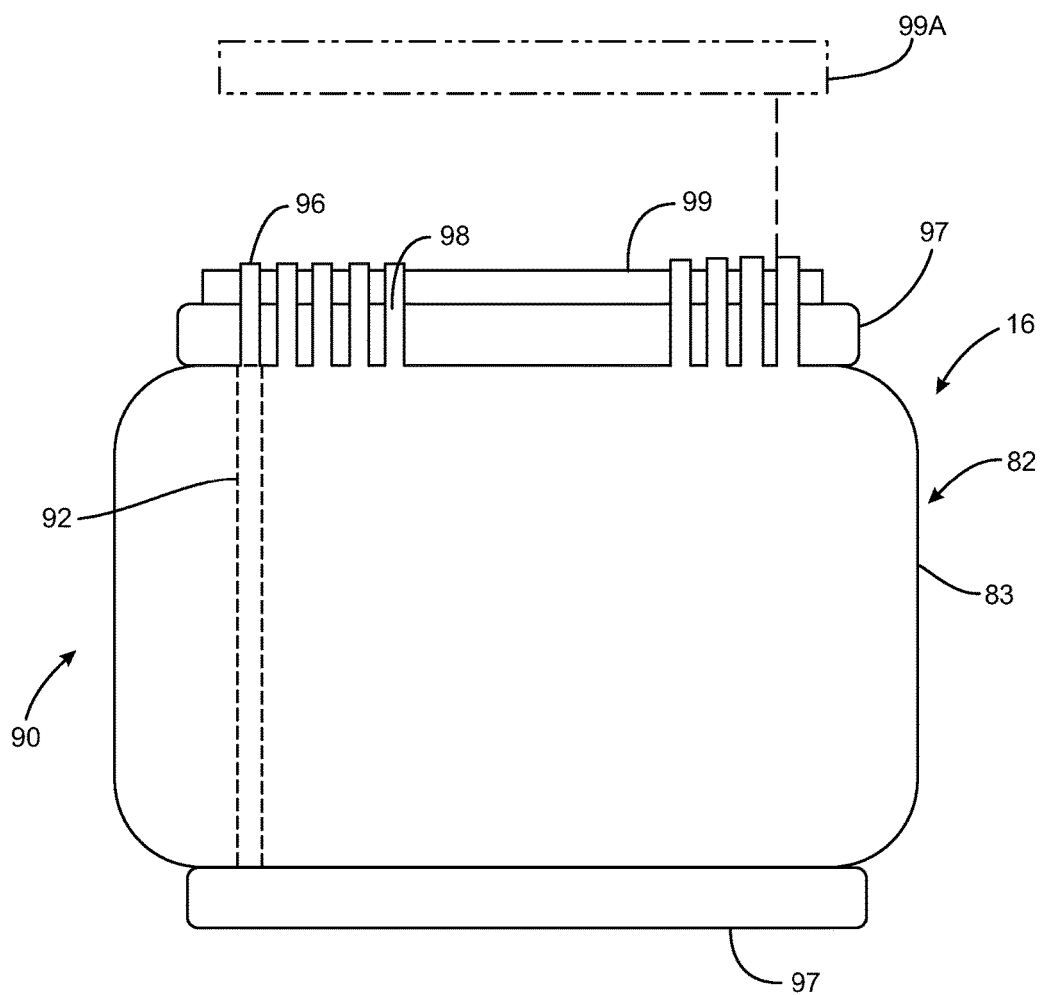
FIG. 3 is a plan view of the stator of FIG. 2.

Referring now to FIG. 3, the connecting portions 96 of the current shields 92 are preferably connected to each other. For example, the leakage current shielding system 90 may also includes a plurality of connectors 98. Each of the connecting portions 96 of the current shields 92 may be connected to one of the plurality of connectors 98. The connectors may be positioned in the motor 12 in any suitable fashion. For example and as shown in FIG. 3, the leakage current shielding system 90 may also include a connecting ring 99 for securing the plurality of connectors 98. The connecting ring 99 may be positioned in the motor 12 in any suitable manner and may, as shown, be connected to one of the opposed end turns 97 of the stator 16. Features, for example protrusions (not shown), may be integrally formed in the ring 99 to secure the ring 99 in its proper position or additional components, for example wires or clips (not shown), may be used to secure the ring 99 in its proper position.

Figure 4:
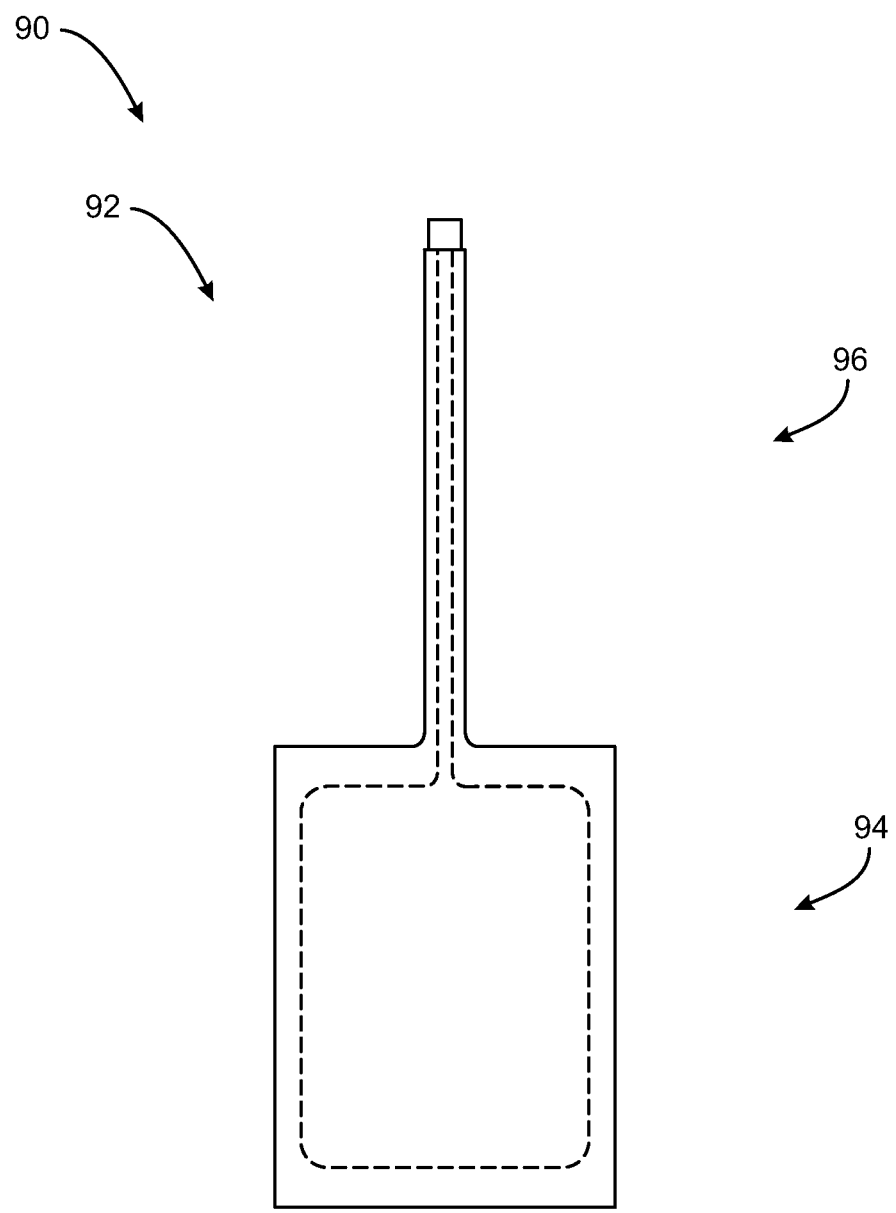
FIG. 4 is a plan view of a leakage current shield according to the present invention.
Figure 5:
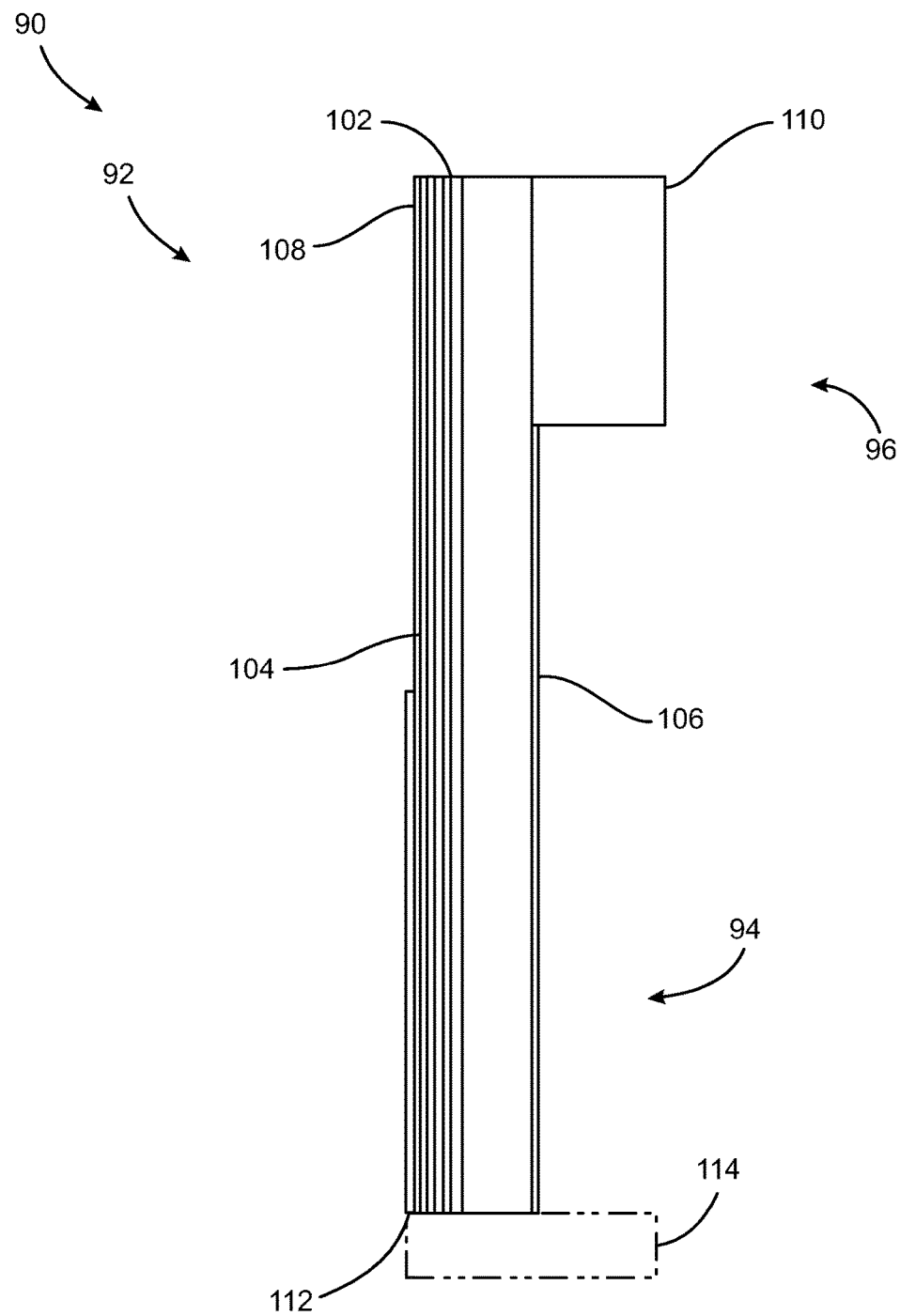
FIG. 5 is an end view of the leakage current shield of FIG. 4.

Referring now to FIGS. 4 and 5 and according to an embodiment of the present invention current shield 92 is shown in greater detail. The current shield 92 includes the body portion 94 and the connecting portion 96 extending from the body portion 94. The current shield 92 includes an internal conductive layer 102 made of an electrically conductive material and adapted to conduct leakage current from the coils or windings 50 (see FIG. 2) toward reference point 87.

The current shield 92 also includes a thin electrically insulating layer 104 on a first side of the internal conductive layer 102 and a thick electrically insulating layer 106 on an opposed second side of the internal conductive layer 102. The insulating layers 104 and 106 generally encapsulate the internal conductive layer 102. The internal conductive layer 102 extends from the body portion 94 to the connection portion 96. A small terminal portion 108 of the thin electrically insulating layer 104 may be formed by removing a portion of the insulating layer 104 from the end of the connection portion 96 to facilitate the conduction of leakage current from the coils or windings 50 (see FIG. 2) toward reference point 87.

The current shield 92 is made of suitable durable materials and is preferably made of a flexible/conformable material that has a body portion 94 that is suited to conform to the shape of the teeth 52 and to fit into one of the pockets 95 and a connection portion 96 that can be positioned for connection to the connectors 98 in the connection ring 99. For example, the internal conductive layer 102 may be made of an electrically conductive material, for example, aluminum, copper or a composite. For example, the insulating layers 104 and 106 may be made of a flexible insulating material, for example, a polymer or a composite, for example, polyester or a Mylar. However, conductive layer 102 and isolative layers 104 and 106 may be fabricated from any material that enables leakage current shield 90 to function as described herein.

As shown in FIG. 4, the body portion 94 of the current shield 92 may have a generally rectangular shape such that when placed in one of the pockets 95 may closely conform to one of the teeth 52. The connection portion 96 may have a long slender shape so that it can be twisted and turned to be positioned for connection to the connectors 98 in the connection ring 99.

As shown in FIG. 5, the current shield 92 may include a stiffening area 110 near the end of the connection portion 96 to provide sufficient stiffness to facilitate the inserting of the connection portion 96 into the connection ring 99.

Figure 6:
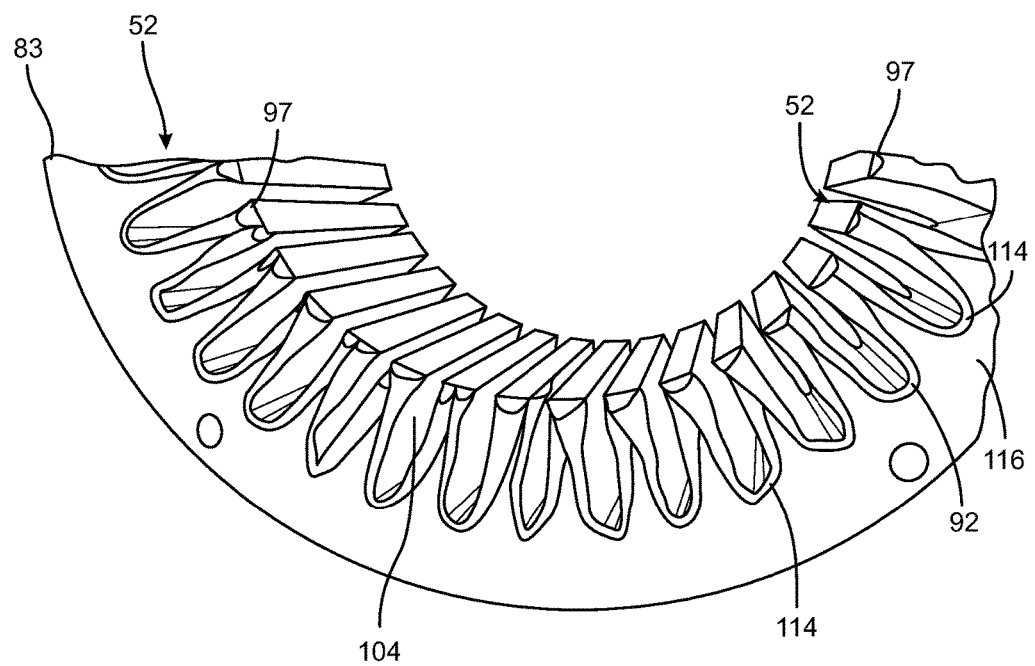
FIG. 6 is a partial perspective view of the stator core of the stator of FIG. 2 with leakage current shields of FIG. 4 installed in the core.

As shown in FIG. 6, the thick electrically insulating layer 106 of the current shield 92 is positioned against the teeth 52 of the stator core 83. As shown outer end 112 of the body portion 94 of the shield 92 may include a lip 114 for cooperation with an end face 116 of the stator core 83. The lip 114 may be formed by bending the outer end 112 of the body portion 94 of the shield 92 as shown in phantom in FIG. 5. It should be appreciated that additional nonconductive material, such as Mylar sheets, may be placed between the teeth 52 of the stator core 83 and the current shield 92.

It should be appreciated that after the current shields 92 are assembled into the pockets 95, the coils or windings 50 are formed around the teeth 52. It should also be appreciated that the current shield 92 may be used on a similar sized tooth 52 and pocket 95 no matter how many teeth 52 are used in the stator core 83. It should be further appreciated how easily the shields 92 may be placed by hand into the pockets 95 and how the lips 97 on the teeth 52 serve to keep the shields 92 in position during the forming of the coils 50. It should also be appreciated that the simplicity of the shield 92 may make the tooling required to make the shield very inexpensive and the process to make the shield 92 and its materials simple and inexpensive.

Figure 7A:
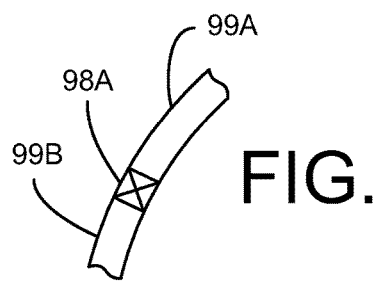
FIG. 7A is a plan view of an alternate exemplary connection ring made from a plurality of components for use in the stator of FIG. 2.
Figure 7:
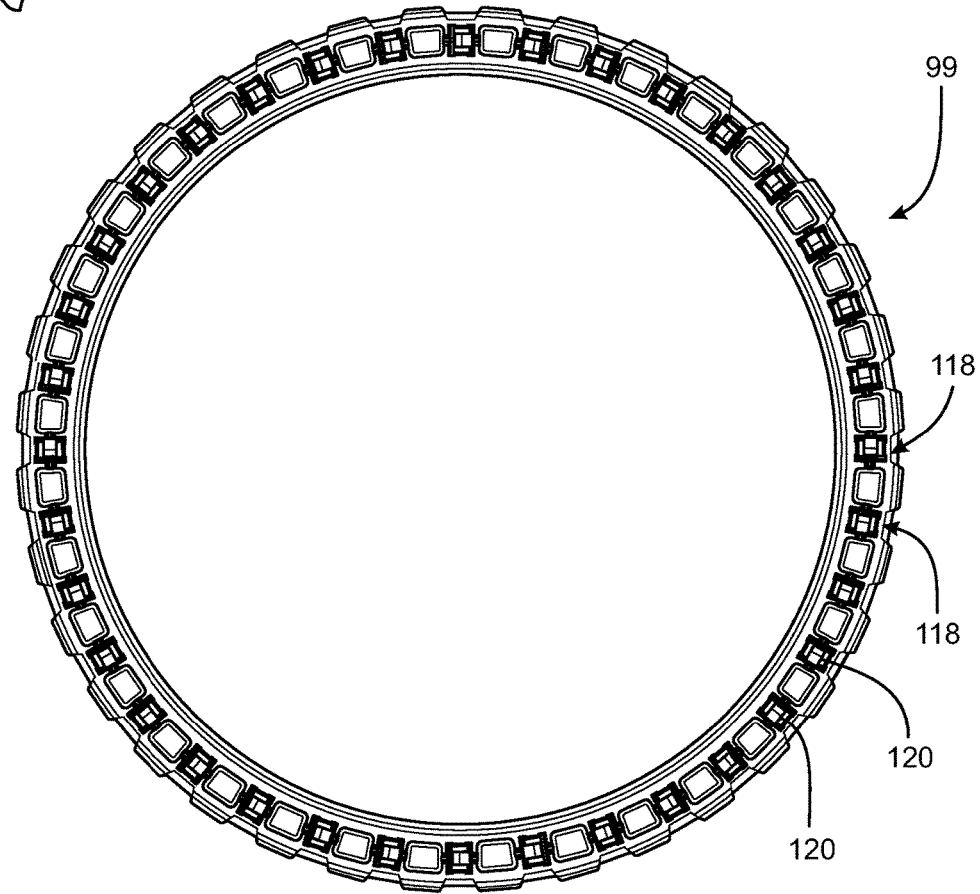
FIG. 7 is a plan view of an exemplary connection ring for use in the stator of FIG. 2.
Figure 8:
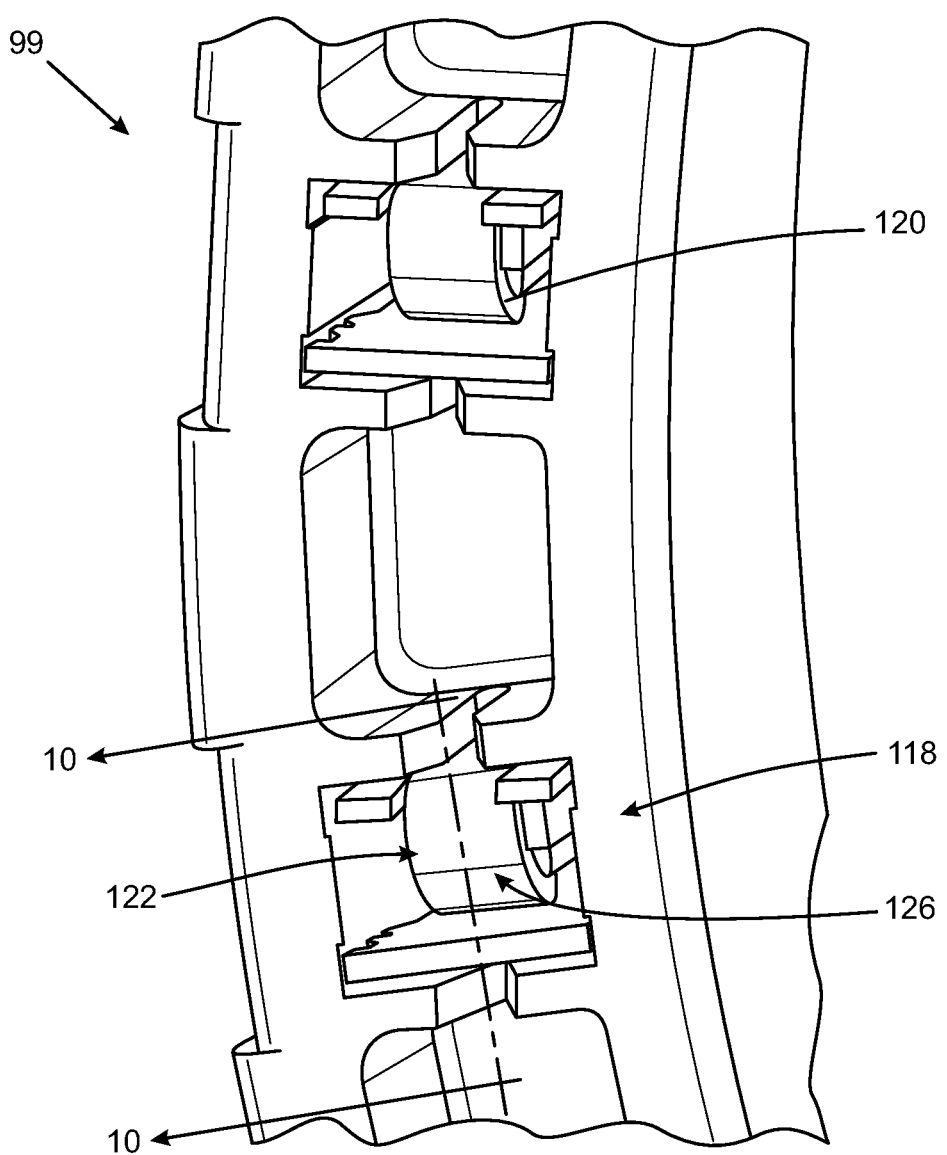
FIG. 8 is a partial perspective view of the connection ring of FIG. 7.

Referring now to FIGS. 7-8 the connection ring 99 is shown in greater detail. The ring 99 may include retaining pockets 118 formed in the ring and corresponding to and positioned in alignment with pockets 95 formed by the teeth 52 of the stator core 83. Conductive connectors 120 are matingly fitted into the retaining pockets 118. The conductive connectors 120 electrically connect the terminal portion 108 of the current shield 92 to reference point 87.

Figure 9:
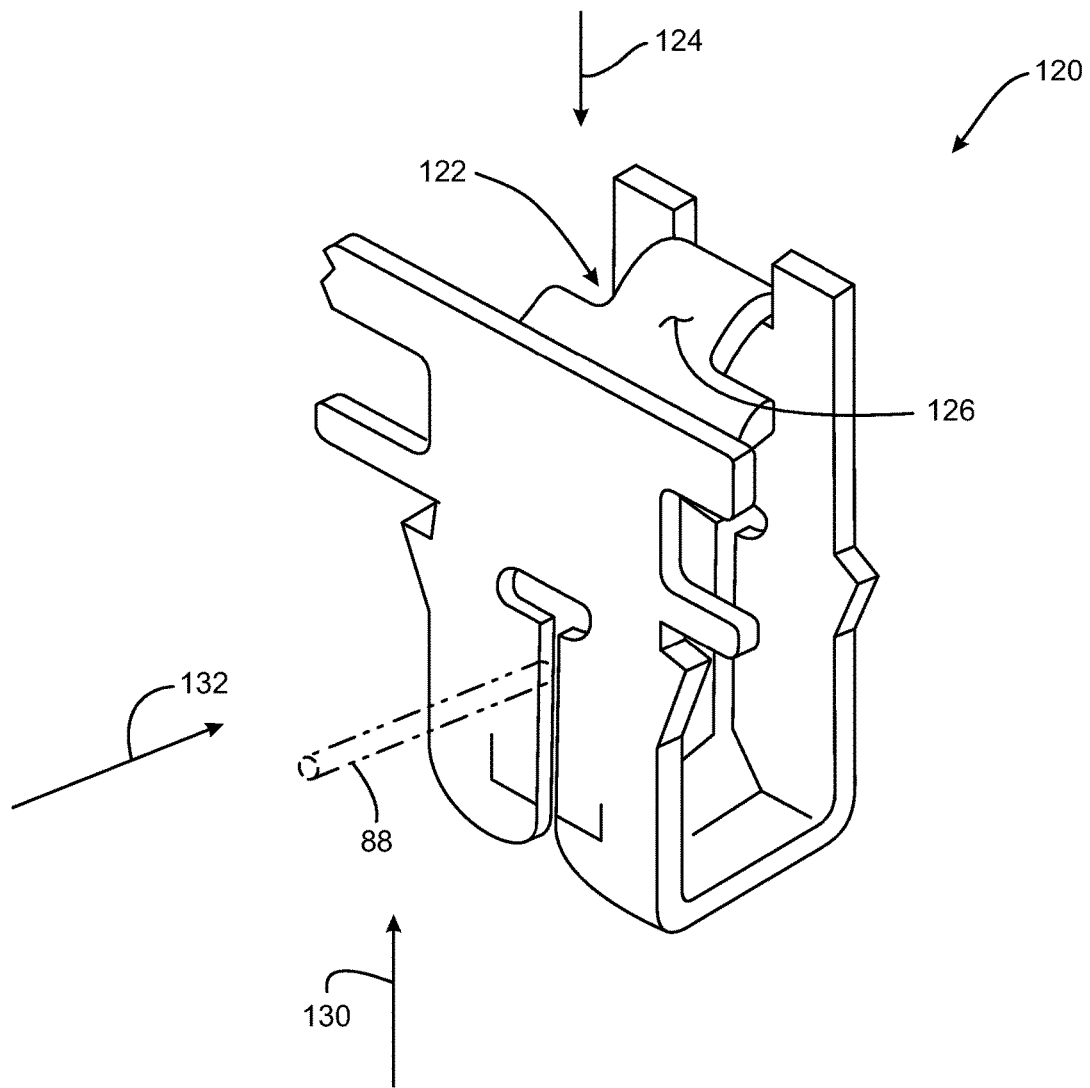
FIG. 9 is a perspective view of a connector for use in the connection ring of FIG. 8.
Figure 10:
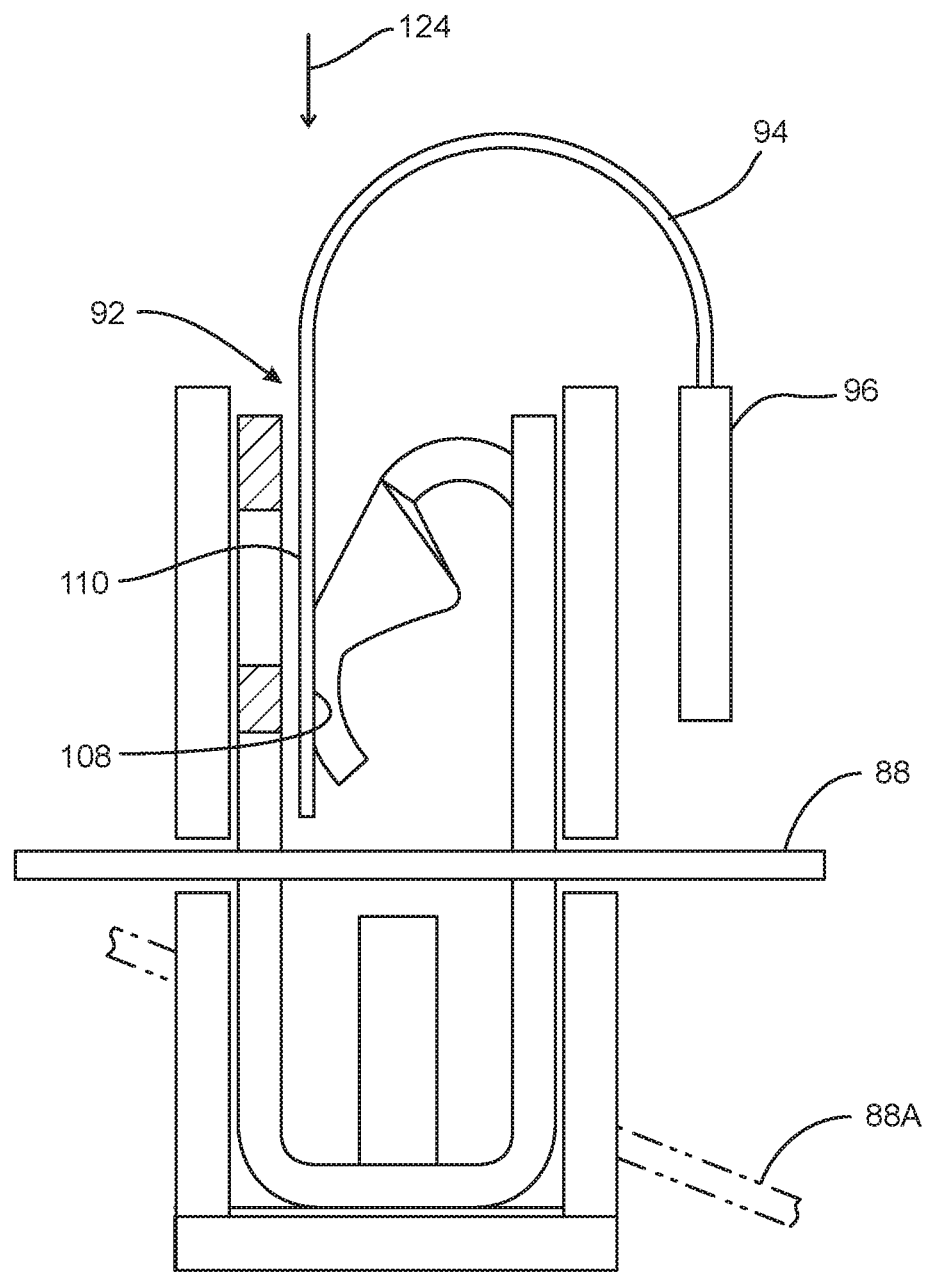
FIG. 10 is a cross sectional view of the connection ring of FIG. 8 the along the line 10-10 in the direction of the arrows.

Referring now to FIGS. 9-10, the conductive connectors 120 is shown in greater detail. The connectors 120 may as shown include a spring arm 122 which cooperates with connection portion 96 of the current shield 92. The connection portion 96 of the current shield 92 is inserted in the direction of arrows 124 with the stiffener 110 of the connection portion 96 engaging the conductive connectors 120 at face 126 of spring arm 122. The terminal portion 108 of the shield 92 electrically engages the spring arm 122 to electrically connect the shield 92 to the connectors 120.

The conductive connectors 120 may further include a tapered elongated wire slit 128 sized to cooperate with ground wire 88. As the wire 88 is advanced in direction of arrow 130 into slit 128, the wire 88 is secured to the clip 120 and electrically connected to the clip 120. In this manner, the connectors are configured to receive the connecting portion 96 of the leakage current shield 92 in a first direction (arrow 124) and to receive the ground wire 88 in a second direction (arrow 132), normal to the first direction.

While, as shown, the ground wire 88 is positioned normal to connection portion of the leakage current shield, it should be appreciated that the ground wire and the current shield may have alternate relative orientations. For example, alternate ground wire 88A may be positioned in a skewed relationship to the current shield. Alternately, the ground wire and the current shield may be parallel to each other (not shown).

The conductive connectors 120 are preferably made of an electrically conductive material, for example a metal or a composite. The connectors 120 may, for example, be made of aluminum and/or copper and may, for example, be stamped from sheet metal or cast.

Referring now to FIGS. 7-8, the ring 99 may be made of any suitable material and may be made of a polymer or a composite. Preferably, the ring 99 is made of an electrically insulating material. The ring may be molded from a polymer or fabricated in any other suitable manner. While the ring 99, as shown in FIG. 7 may be integral, it should be appreciate that the ring may be made from a plurality of components or may be modular.

For example and as shown in FIG. 7A, the ring may be modular and include ring segments 99A and 98B. There may be any suitable number of segments 99A and 99B. The segments 99A and 99B may be connected to each other by bridging connections 98A that may for example be connections integral to the segments 99A and 99B, for example protrusions and voids, for example a dovetail connection, a tab and a recess, etc. Alternately the connections may be separate fasteners or weldments. Alternatively the connections 98A may be absent, relying on other components, for example housing 93 etc. to contain the segments 99A and 99B. It should be appreciated that the ring, whether integral or modular, may be rigid or flexible. Further, the ring, whether integral or modular, may have one or more of any number of shapes (square, circular, triangular, planar/flat (part of circuit board, etc).

According to an aspect of the present invention, the electric motor 12 may be provided wherein the plurality of leakage current shields 92 includes a conductive layer 102 coupled to a reference point having an electric potential that is not earth ground. Further, the conductive layer may be coupled to a potential that is adapted to further facilitate reducing one or more of a shaft voltage, a bearing current present in the electric machine, and electromagnetic interference (EMI) created by the electric machine.

In the exemplary embodiment, at least one electrical connector 98 couples conductive layer 102 of shield 92 in parallel to a reference point 87. In the exemplary embodiment, reference point 110 is a position, for example, a position within Motor control circuitry 62 (shown in FIG. 1) that is at an electronic ground potential. Reference point 87 (also referred to herein as electronic ground 87) is a potential that is different from earth ground.

Figure 11:
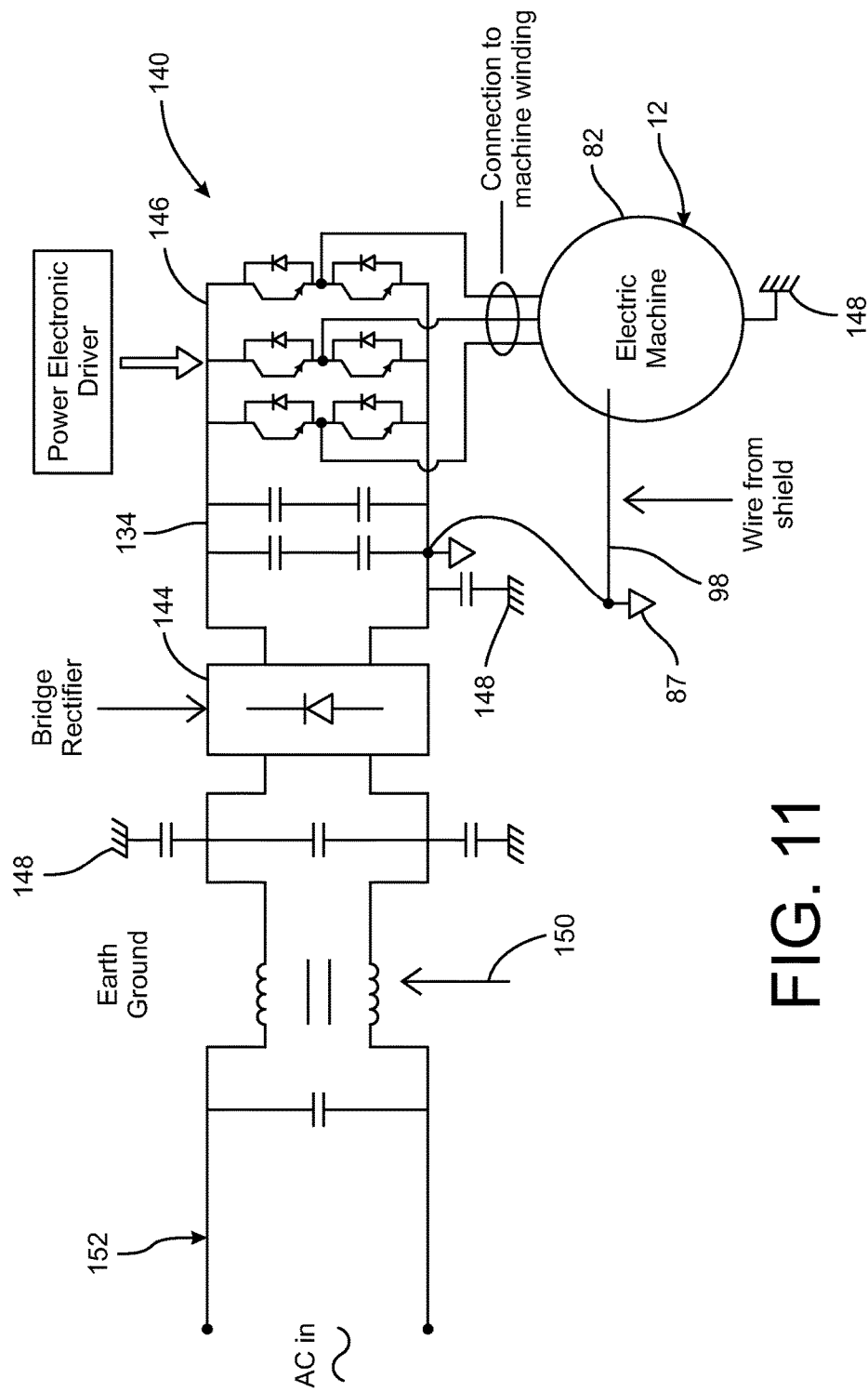
FIG. 11 is a schematic diagram of a circuit for use with the leakage current shield for the motor of FIG. 1.

FIG. 11 is a circuit diagram of an exemplary drive circuit 140 for electric motor 12. Drive circuit 140 provides electrical power and control signals to electric motor 12. In an exemplary embodiment, drive circuit 140 is a variable frequency drive and/or an adjustable speed drive. Switching the voltages provided to windings 52 (shown in FIG. 2), as performed by a variable frequency drive and/or an adjustable speed drive, energizes the parasitic capacitance, which is a contributing factor to the creation of leakage current.

Connector 98 couples the conductive layers of the leakage current shield 92 (shown in FIG. 2) to electronic ground 87. In the exemplary embodiment, connector 98 couples the conductive layers 102 of the leakage current shield 92 (shown in FIG. 2) to drive circuit 140 at a position between a bridge rectifier 144 and power electronic drivers 146. More specifically, positions with drive circuit 140, for example at an inverter 134, provide the electronic ground 87 used by leakage current shield 92. Connector 98 may couple the conductive layers of leakage current shield (shown in FIG. 2) to any position (i.e., reference point) within drive circuit 140 that has a potential that is different than earth ground 148.

Current leakage shield 92 operates as a capacitor positioned between windings 52 (shown in FIG. 2) and stator shell 82. In the exemplary embodiment, by maintaining this capacitor at electronic ground potential 87 that is different than earth ground 148, leakage currents from motor 12 (shown in FIG. 1) and/or drive circuit 140 (shown in FIG. 11) are reduced and/or suppressed. By reducing and/or suppressing leakage current, current leakage shield 92 facilitates a reduction in nuisance tripping of a GFCI 150 positioned between motor 12 and drive circuit 140 (shown in FIG. 3), and a power source 152. Additionally, by reducing and/or suppressing leakage current, current leakage shield 92 facilitates a reduction in electromagnetic interference (EMI) created by motor 12 and/or drive circuit 140. Furthermore, current leakage shield 90 also facilitates a reduction in shaft voltages and bearing currents present in motor 12.

The above-described methods and apparatus are cost-effective and highly reliable for reducing leakage currents created by a variable frequency drive and motor combination. The methods and apparatus describe positioning a leakage current shield within an electric motor and coupling that shield to an electronic ground. The alternating conductor and insulator layers of the leakage current shield act as a capacitor, which reduces and/or suppresses the leakage ground currents produced by an electric motor and/or a variable frequency drive. The reduction in leakage current may reduce EMI produced by the motor and drive circuitry, shaft voltages and bearing currents present in the motor, and the frequency of nuisance tripping of GFCI. The reduction in leakage current may also increase efficiency of the motor. The reduction in leakage current is achieved while limiting complications to the manufacturing process used to create the motor and drive circuit, while limiting, and potentially not changing, a motor's specifications. The reduction is also achieved while maintaining a substantially similar input voltage as would be used with a motor that does not include the leakage current shield.

According to another embodiment of the present invention and referring to FIGS. 1-11, a leakage current shielding system 90 for an electric machine 12 is provided. The electric machine 12 has a stator 16 that includes a plurality of windings 50 positioned around at least one stator tooth 52. The leakage current shielding system 90 includes a plurality of leakage current shields 92. Each of the plurality of leakage current shields 92 has a body portion 94 thereof positioned between the plurality of teeth 52 and the plurality of windings 50 and a connecting portion 96 extending from the body portion 94. The leakage current shielding system 90 also includes a plurality of connectors 98. Each of the plurality of connectors 98 is adapted for receiving the connection portion 96 of the leakage current shield 92. The leakage current shielding system 90 also includes a connecting ring 99 for securing the plurality of connectors 98.

Figure 12:
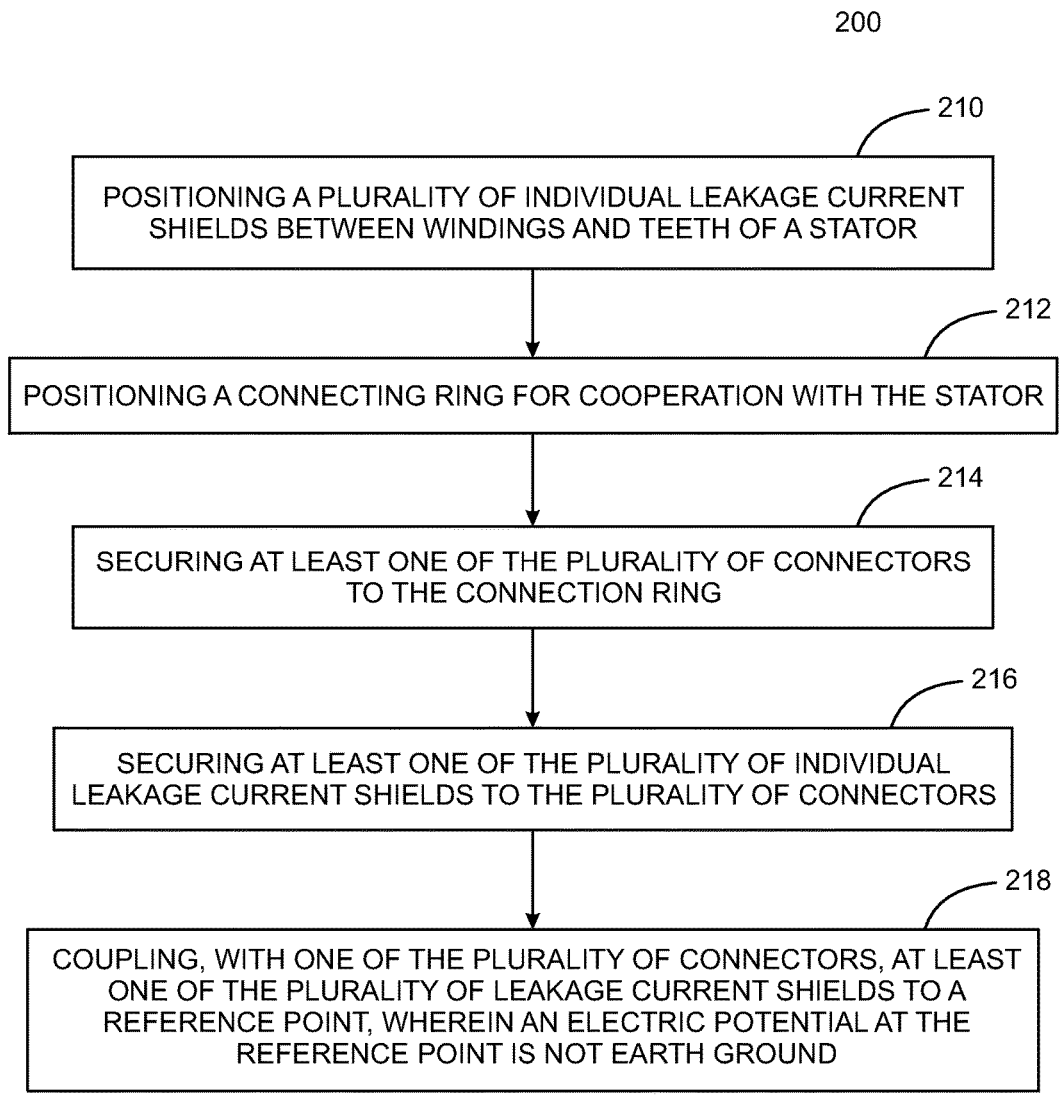
FIG. 12 is a flow chart of another embodiment of the present invention in the form of a method for providing an electric machine.

According to another embodiment of the present invention and referring to FIG. 12, a method 200 for reducing leakage currents in an electric machine is provided. The method 200 includes step 210 of positioning a plurality of individual leakage current shields between windings and teeth of a stator and step 212 of positioning a connecting ring for cooperation with the stator.

The method 200 also includes the step 214 of securing at least one of the plurality of connectors to the connection ring and the step 216 of securing at least one of the plurality of individual leakage current shields to the plurality of connectors.

The method 200 also includes the step 218 of coupling, with one of the plurality of connectors, at least one of the plurality of leakage current shields to a reference point, wherein an electric potential at the reference point is not earth ground.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine comprising:
a rotor;
a stator including a plurality of teeth defining a pocket between each adjacent tooth and a plurality of windings, each of said plurality of windings positioned around one of said plurality of teeth; and
a leakage current shielding system including:
a plurality of leakage current shields, each of said plurality of leakage current shields including a flexible body portion thereof, the body portion defining a body portion width thereof, the body portion being conformable from a planar shape to a body arcuate shape, the body portion of each leakage current shield positioned in one of the pockets and closely conforming to the adjacent teeth when in the body arcuate shape and a connecting portion integral with the body portion, the connecting portion defining a connecting portion width thereof the connecting portion width being substantially narrower than the body portion width of the body portion, the connecting portion extending from the body portion and conformable from a planar shape to a twisted shape in a connecting orientation substantially different from a body orientation of the connecting portion, the body orientation being the orientation of the connecting portion where the connecting portion connects to the body portion;
a connecting ring for securing a plurality of connectors; and
each of said plurality of connectors mounted to the connecting ring, positioned adjacent one of the plurality of windings and having a conductive portion that directly receives and secures the connecting portion of said leakage current shield when the connecting portion is in the twisted shape in the connecting orientation, the connecting portion being conformable to the connecting orientation while the body portion is in the body arcuate shape.

2. An electric machine in accordance with claim 1, wherein said plurality of leakage current shields comprising a conductive layer coupled to a reference point having an electric potential that is not earth ground.

3. An electric machine in accordance with claim 2, further comprising a terminal portion configured to couple said conductive layer to said reference point.

4. An electric machine in accordance with claim 1, wherein each of said plurality of leakage current shields further comprises: a conductive layer; a first insulating layer positioned between at least one of said plurality of teeth and said conductive layer; and a second insulating layer positioned adjacent to said conductive layer, opposed to said first insulating layer.

5. An electric machine in accordance with claim 4, wherein said conductive layer is coupled to a potential that is not earth ground and adapted to further facilitate reducing one or more of: a shaft voltage and a bearing current present in said electric machine, and electromagnetic interference (EMI) created by said electric machine.

6. An electric machine in accordance with claim 1, wherein each of said plurality of leakage current shields is separated from each other.

7. An electric machine in accordance with claim 1, wherein said leakage current shielding system further includes a conductor for connecting the leakage current shields to each other.

8. An electric machine in accordance with claim 7, wherein said connectors are configured to receive the connecting portion of said leakage current shield in a first direction and to receive said conductor in a second direction, normal to the first direction.

9. An electric machine in accordance with claim 1, wherein said electric machine is coupled to and controlled by a variable frequency drive circuit.

10. A leakage current shielding system for an electric machine, the electric machine having a stator having a plurality of stator teeth defining a pocket between each adjacent tooth, the machine includes a plurality of windings, each winding positioned around one of the plurality of stator teeth, said leakage current shielding system including:
a plurality of leakage current shields, each of said plurality of leakage current shields including a flexible body portion thereof, the body portion defining a body portion width thereof, the body portion being conformable from a planar shape to an arcuate shape, the body portion of each leakage current shield positioned in one of the pockets and closely conforming to the adjacent teeth when in the body arcuate shape and a connecting portion integral with the body portion, the connecting portion defining a connecting portion width thereof, the connecting portion width being substantially narrower than the body portion width of the body portion, the connecting portion extending from the body portion and conformable from a planar shape to a twisted shape in a connecting orientation substantially different from a body orientation of the connecting portion, the body orientation being the orientation of the connecting portion where the connecting portion connects to the body portion;
a connecting ring positioned adjacent the plurality of windings; and
a plurality of connectors, each of said plurality of connectors mounted to the connecting ring, positioned adjacent one of the plurality of windings and having a conductive portion that directly receives and secures the connecting portion of said leakage current shield when the connecting portion is in the twisted shape in the connecting orientation, the connecting portion being conformable to the connecting orientation while the body portion is in the body arcuate shape.

11. A leakage current shielding system in accordance with claim 10, wherein said plurality of leakage current shields comprise a conductive layer coupled to a reference point having an electric potential that is not earth ground.

12. A leakage current shield in accordance with claim 11, wherein the connecting portion of the leakage current shields include a terminal portion to facilitate the conduction of leakage current.

13. A leakage current shielding system in accordance with claim 10, wherein each of said plurality of leakage current shields further comprises: a conductive layer; a first insulating layer positioned between at least one of said plurality of teeth and said conductive layer; and a second insulating layer positioned adjacent to said conductive layer, opposed to said first insulating layer.

14. A leakage current shielding system in accordance with claim 10, wherein each of said plurality of leakage current shields is separated from each other.

15. A leakage current shielding system in accordance with claim 10, wherein said leakage current shielding system further includes a conductor for connecting the leakage current shields to each other.

16. A leakage current shielding system in accordance with claim 15, wherein said connectors are configured to receive the connecting portion of said leakage current shield in a first direction and to receive said conductor in a second direction, normal to the first direction.

17. A method for reducing leakage currents in an electric machine, said method comprising:
  providing a plurality of individual leakage current shields, each of the plurality of leakage current shields made of a flexible sheet including a conductive core and opposed insulative coatings and including a body portion defining a body portion width thereof and a connecting portion defining a connecting portion width thereof, the connecting portion width being substantially narrower than the body portion width of the body portion;
  removing the coatings from an end of the connecting portion of the plurality of leakage current shields to form a leakage current shield terminal;
  positioning the wide body portion of the plurality of individual leakage current shields in a body arcuate shape between windings and teeth of a stator;
  positioning a connecting ring for cooperation with the stator;
  twisting each of the connecting portions of the plurality of individual current shields from a planar shape to a twisted shape in a connecting orientation substantially different from a body orientation of the connecting portion, the body orientation being the orientation of the connecting portion where the connecting portion connects to the body portion;
  securing at least one of a plurality of connectors to a connection ring;
  securing the leakage current shield terminal of at least one of the plurality of individual leakage current shields to one of the plurality of connectors; and
  coupling, with one of the plurality of connectors, at least one of the plurality of leakage current shields to a reference point, wherein an electric potential at the reference point is not earth ground.

18. A leakage current shielding system in accordance with claim 10, wherein the connecting portion of the leakage current shields include a stiffening area to facilitate the insertion of the connecting portion into the connector.

19. An electric machine in accordance with claim 1, wherein the connecting portion of the leakage current shields include a terminal portion to facilitate the conduction of leakage current.

20. An electric machine in accordance with claim 1, wherein the connecting portion of the leakage current shields include a stiffening area to facilitate the insertion of the connecting portion into the connector.

* * * * *